US008903858B2

(12) United States Patent
Ramaswamy (10) Patent No.: US 8,903,858 B2
(45) Date of Patent: Dec. 2, 2014

(54) USER INTERFACE AND SYSTEM FOR TWO-STAGE SEARCH

(75) Inventor: Satyanarayanan Ramaswamy, Cupertino, CA (US)

(73) Assignee: Tata Consultancy Services Limited, New York, NY (US)

(*) Notice: Subject to any disclaimer, the term of this patent is extended or adjusted under 35 U.S.C. 154(b) by 212 days.

(21) Appl. No.: 12/655,836

(22) Filed: Jan. 8, 2010

(65) Prior Publication Data

US 2010/0179964 A1 Jul. 15, 2010

Related U.S. Application Data

(60) Provisional application No. 61/204,774, filed on Jan. 9, 2009.

(51) Int. Cl.
*G06F 17/30* (2006.01)
(52) U.S. Cl.
CPC .................. *G06F 17/3064* (2013.01)
USPC ........................................... 707/780
(58) Field of Classification Search
CPC .................................. G06F 17/3064
USPC ................................ 707/767, 780
See application file for complete search history.

(56) References Cited

U.S. PATENT DOCUMENTS

| 2006/0190436 A1* | 8/2006 | Richardson et al. ............. 707/3 |
| 2006/0248078 A1* | 11/2006 | Gross et al. ..................... 707/5 |
| 2008/0114743 A1* | 5/2008 | Venkataraman et al. ......... 707/3 |

OTHER PUBLICATIONS http://www.google.com.
http://www.youtube.com.
http://www.yahoo.com.
http://www.hulu.com.

* cited by examiner

*Primary Examiner* — Huawen Peng
(74) *Attorney, Agent, or Firm* — Schwegman Lundberg & Woessner, P.A.

(57) ABSTRACT

This invention relates in general to search and more specifically to two-stage search, where first an incremental character-based search for the keywords and sub keyphrases that together form the target keyphrase to be searched for is performed in order to construct the target keyphrase and then a search for the target keyphrase so constructed is performed among the documents to be searched. The system in this invention is comprised of a user device system from the which the user performs the search, a search server system which performs the search for keywords and sub keyphrases that together form the target keyphrase using text entered by the user and performs the search for documents using the target keyphrase constructed by the user, and an advertisement server system that performs the search for advertisements corresponding to the target keyphrase.

14 Claims, 6 Drawing Sheets

USER INTERFACE AND SYSTEM FOR TWO-STAGE SEARCH

I hereby claim priority to my earlier filed Provisional Patent Application with Application No. 61/204,774 with filing-or-371(c) date: Jan. 9, 2009.

CROSS-REFERENCE TO RELATED APPLICATIONS

Not Applicable

FIELD OF THE INVENTION

This invention relates in general to search and more specifically to two-stage search, where first an incremental character-based search for the keywords and sub keyphrases that together form the target keyphrase to be searched for is performed in order to construct the target keyphrase and then a search for the target keyphrase so constructed is performed among the documents to be searched. Such a two-stage search is useful for example, while performing a search for products from devices such as mobile phones where it is difficult for the user to enter text.

BACKGROUND OF THE INVENTION

Searching for information has become an integral part of everyday life. Yet, there are many instances where one would want to search for information but a convenient tool is not available to perform the desired search at that very moment. This is because, today search activity is mostly confined to the PC. While a PC with a keyboard, mouse, and a big screen is a convenient tool to perform search, it is not possible for a user to carry a PC everywhere. However, most users typically carry a mobile phone with them. Mobile phones are increasingly provided with a broadband connection, and hence could be useful tools for performing search. However, mobile phones also suffer from drawbacks—the lack of a substantial keyboard to enter information, and the lack of a mouse and a big monitor to see, navigate and understand the results. If a convenient mechanism can be devised utilizing the limited keypad of a mobile, then the opportunity for users to perform more searches increases dramatically. For example, shoppers can access information about products right when they are in a store.

Prior art solutions to minimize text entry during search can be found both on the PC as well as on mobile phones and other devices. A user who wants to search, typically has a complete target keyphrase in mind such as "silicon valley roads" which in turn is composed of one or more distinct keywords—in this case, "silicon", "valley", and "roads" (where a keyword is a component of a target keyphrase that cannot be further decomposed); or a combination of one or more sub keyphrases such as "silicon valley" and keywords such as "roads" (where a sub keyphrase is a component of the target keyphrase that itself can be decomposed further into component keywords). The entire set of documents that have to be searched—for example all web pages, or descriptions of products in a store—is called the domain of the search. Two primary classes of solutions exist to minimize user effort in entering search target keyphrases. Search engines such as Google, YouTube and Yahoo, provide search suggestions. See panel 405 in FIG. 4 for an example of the Search Suggestions Approach. When a user starts typing in the search box, the system responds with suggestions for target keyphrases based on what the user has already entered in the search box. For example, if the user wants to search for "silicon valley" and starts entering 's', 'i', 'l', 'i', . . . with each character entered, the system progressively suggests search target keyphrase suggestions. Note that in these systems, what is suggested is the target keyphrase itself and not components (keywords and sub keyphrases) using which the user can compose a target keyphrase. If the user sees the intended complete target keyphrase, he selects it and the system then immediately performs a search for that target keyphrase and returns document results. Note that once the user selects a suggested target keyphrase, the search is launched immediately—the user has no ability to modify the target keyphrase suggestion in any way. Search suggestions are typically constructed from most popular searches and are not exhaustive given the limitation on the space available for suggestions. As a result, much of the time, the user ends up entering the full, intended target keyphrase manually and then launches the search. For example, if the user wants to search for chocolate cakes with raisin topping and wants to use the target keyphrase "chocolate cake raisin topping", unless this exact target keyphrase is a popular target keyphrase and appears as a search suggestion, he will have to enter the whole target keyphrase manually. Even if "chocolate cake" or "raisin topping" by themselves are search suggestions, they are of no use in constructing the intended target keyphrase "chocolate cake raisin topping" by combining the two, since the moment the user selects one of these suggestions, a search is launched with that suggestion as the target keyphrase. Hence the objective of reducing user effort in entering search target keyphrases is not realized. The second prior art method of reducing text entry while searching is to produce the final results set itself with every character entered, instead of target keyphrase suggestions. An example is the Hulu Search (http://www.hulu.com). In these types of systems, when a user enters a keyphrase, each character entry triggers a request to the search system that generates full document results based on documents that correspond to target keyphrases that contain the text the user has entered till that point. See panel 425 in FIG. 4 for an example. The problem with this approach of directly generating document results with every character entered is that it is difficult to interface such a system with search-based advertisement systems. The specific target keyphrase intended by the user is not known since the step of presenting these to the user for him to select one is bypassed completely. Typical search-based advertisement systems require full target keyphrases to generate matching advertisements. In the systems where results are directly generated with every character entered by the user, only partial prefixes of target keyphrases that user potentially has in mind are available and hence it is difficult to extrapolate a partial target keyphrase to the specific full target keyphrase intended by the user for use in the advertisement systems. In addition, since the user never directly selects the target keyphrase, he may be confused as to why a certain result has appeared for the text he has entered so far.

In this invention, a user interface and system are presented for a "two-stage" approach to search. In the first stage, the target keyphrase is constructed while minimizing text entry by the user. Keywords and sub key phrases in the user desired target keyphrase are constructed by searching for these within the set of all available keywords and sub keyphrases with every character entered by the user. Once the keyword or sub keyphrase sought by the user is found, and selected by the user, it is added to the target keyphrase. Once the full target keyphrase is so constructed in the first stage, upon the user's request to launch a search using that target keyphrase, a search is performed in the second stage using the full target keyphrase constructed in the first stage. Since the keyword/ sub keyphrase search to construct a full target keyphrase in the first stage is exhaustive, the user will be able to find the keyword or sub keyphrase he is looking for, potentially with minimum number of characters entered. Hence the limitation of the first type of prior art (Search Suggestions) discussed above, where users may not fully get the benefit of minimal text entry, is overcome. Since this invention preserves the notion of a target keyphrase that is explicitly selected by the user, it can be integrated into keyword-based advertisement systems.

BRIEF SUMMARY OF THE INVENTION

This invention addresses the shortcomings associated with prior art as discussed above, by providing a two-stage approach to search from devices with limited text input capability. In the first stage, the full target keyphrase to be used for search is constructed by first searching for the individual keywords and/or sub keyphrases that together form the full target keyphrase and then in the second stage, the full target keyphrase is searched for within the domain being searched. This invention also enables interfacing of the search systems with advertisement systems based on the target keyphrase constructed in stage 1.

Consistent with one aspect of the invention, the user is presented with a search bar on the display screen of the device. When the user enters any character in the search bar, a request is sent to a Search Server System, which responds with a list of keywords and sub keyphrases that are a match for that character. The results are ordered according to an appropriate measure of relevance so that the most relevant keyword or sub keyphrase is at the top. When the user doesn't select any of the presented keywords or sub keyphrases and enters the next character, the two characters so far entered are sent to the Search Server System and the corresponding keyword and sub key phrase results are sent back to the device. This is repeated till the user sees the keyword or sub keyphrase he is looking for and selects it. Once the user selects that keyword or sub keyphrase, it is added to the end of the target keyphrase. Once the user has selected a keyword or sub keyphrase as above, the keyword/sub keyphrase selection process above is repeated to select the next keyword or sub keyphrase in the target keyphrase. This process ends when the user has constructed the full target keyphrase he has in mind. By presenting keyword/sub keyphrase results with every character entered and narrowing the choices as more characters are typed and ordering them by relevance factors, the user's effort in typing the full target keyphrase is reduced.

Consistent with another aspect of the invention, once the user has constructed the target keyphrase he has in mind, he selects a search key to initiate a search of the domain using the target keyphrase. Upon this, the target keyphrase with its component keywords and sub key phrases are sent to the Search Server System. The Search Server System performs a search of the domain being searched and returns the result documents back to the device.

Consistent with yet another aspect of the invention, once the user has constructed the target keyphrase he has in mind and selects a search key, the keyphrase with its component keywords and sub key phrases are also sent to the Advertisement Server System. The Advertisement Server System then returns a set of advertisements that are relevant to the target keyphrase sent. These advertisements are displayed on the device's screen along with result documents.

DETAILED DESCRIPTION OF THE INVENTION

Figure 1:
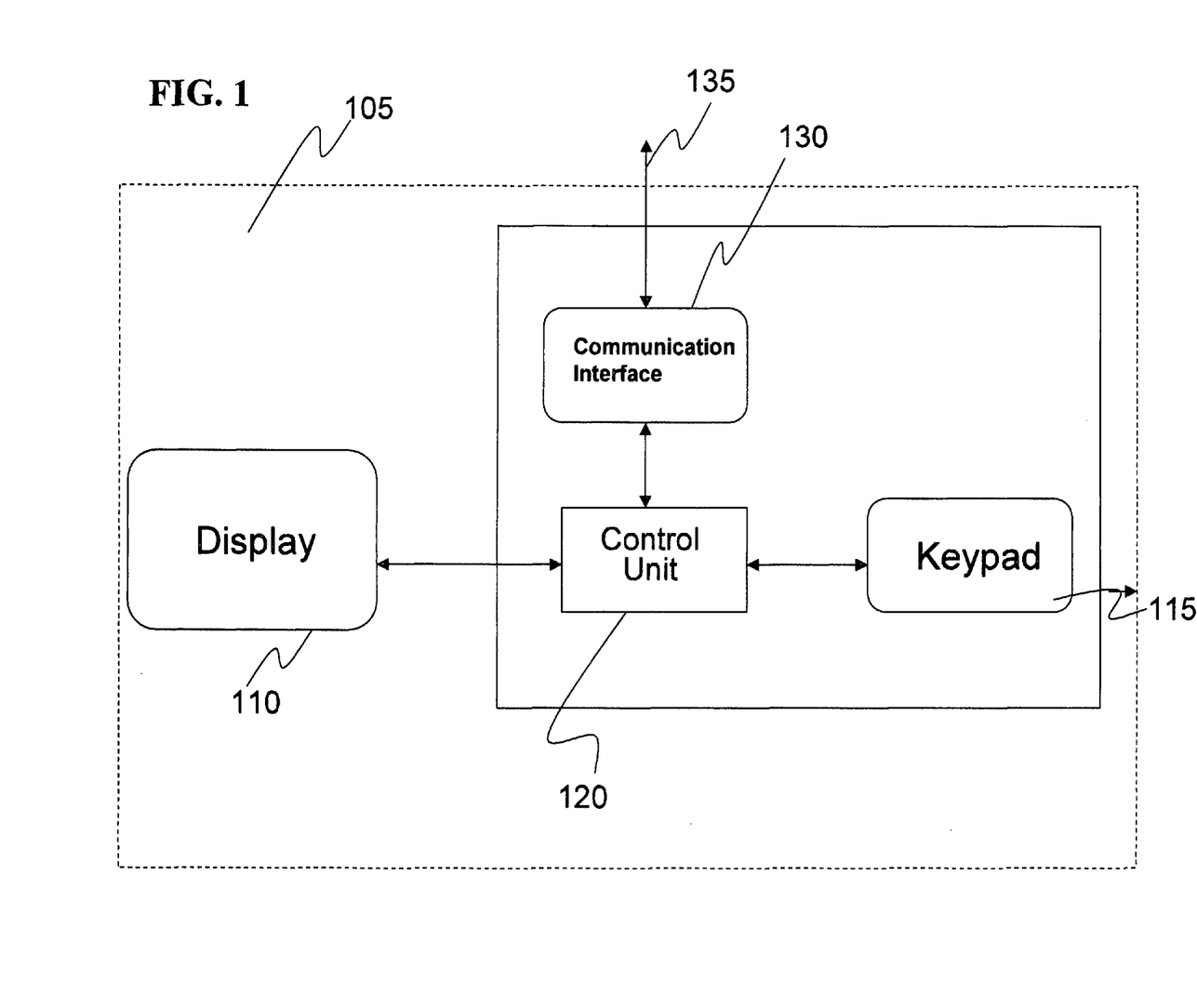
FIG. 1 is an exemplary simplified semi-schematic block diagram of a User Device System in accordance with this invention.

FIG. 1 presents a simplified semi-schematic block diagram of a User Device System 105 operable in accordance with this invention. As illustrated in FIG. 1, the User Device System consists of a display 110 that is used to display system responses and messages to the user. This display can be integrated with the rest of the device as in a mobile phone, or it could be separate from the rest of the device as in a television or a desktop PC. The User Device System also has a keypad 115 used to obtain user-typed inputs to the system. This keypad could be a physical keypad or it could be a soft keypad which is displayed on a touch sensitive display or a separate display 110 and whose keys can be activated by the user by touching appropriate displayed keys. This keypad could be an integrated keypad as in a mobile phone or a separated keypad as in a television remote or a PC. The User Device System has a control unit 120 that controls all other parts of the User Device System with either software and/or hardware commands. The User Device System-side logic of the system as embodied in this invention is performed by this control unit. The control unit is also connected to a communication interface 130 that is connected to a communication link 135 using which the User Device System communicates with the Search Server Systems 205 and Advertisement Server Systems 305. Any one of a variety of wired and wireless technologies can be used to provide the communication link to/from the user device. In embodiments where the User Device System and the Search Server System are collocated on the same physical device, this communication link will be an internal communication link.

Figure 2:
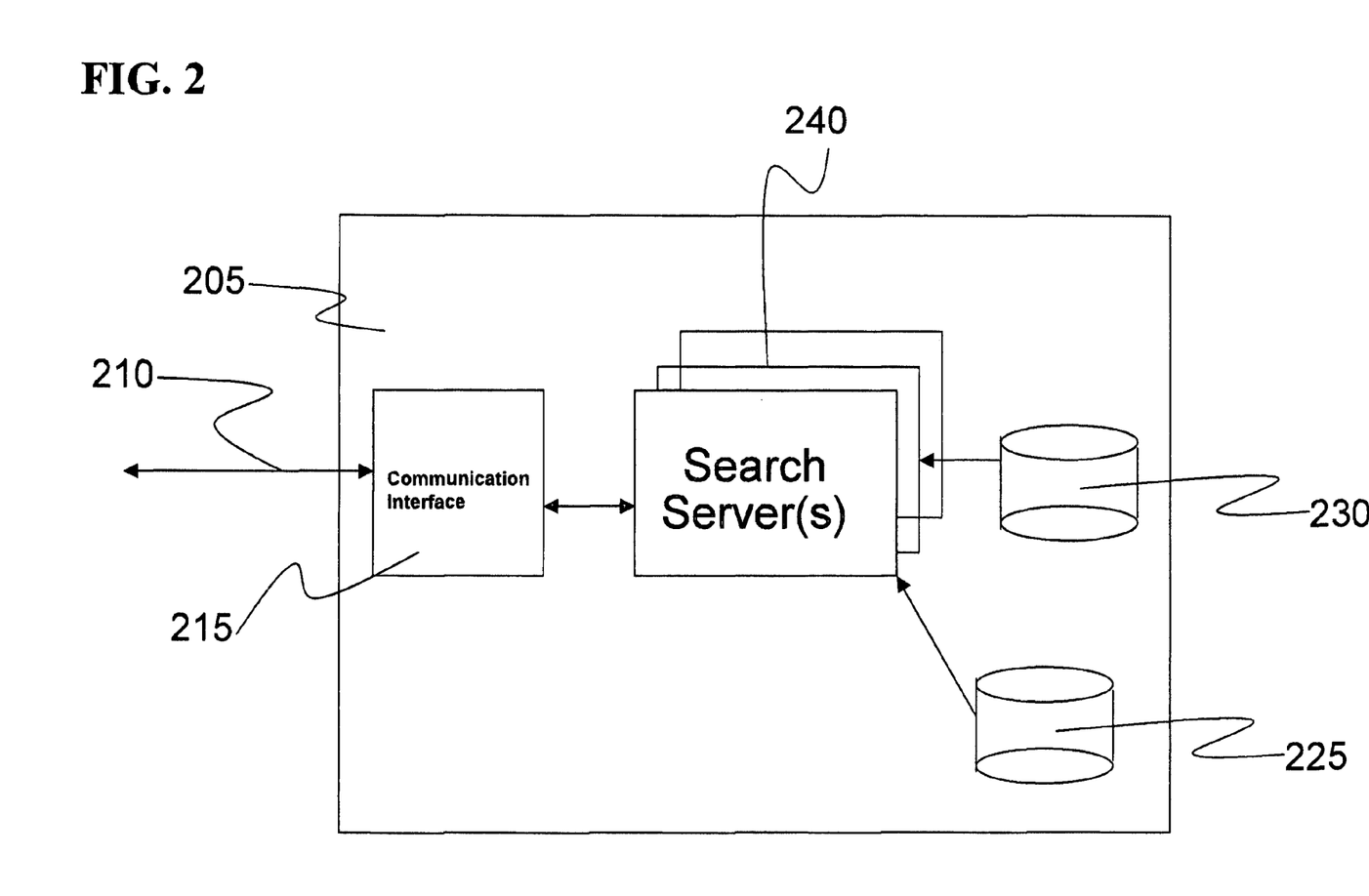
FIG. 2 is an exemplary simplified semi-schematic block diagram of a Search Server System in accordance with this invention.

FIG. 2 presents a simplified semi-schematic block diagram of a Search Server System 205 in accordance with this invention. The Search Server System communicates with a plurality of User Device Systems 105 via the communication link 210 and a communication interface 215. The Search Server System consists of one or more Search Server(s) 240 that perform searches as in this invention. Each Search Server is connected to a first keyword index 225 that is used by the Search Servers in the stage 1 of the two-stage search method in accordance with this invention. The Search Servers use the keyword index to identify the keywords and sub keyphrases that must be sent as results when the user enters text from the User Device System. The keyword index is exhaustive in terms of all keywords and sub keyphrases using which documents in the search domain can be searched for and are constructed a priori from the documents in the search domain.

The Search Server System is also connected to a second document index 230 that is used by the Search Servers to establish the document results that correspond to any given target keyphrase. It will be appreciated that FIG. 2 is not prescriptive in terms of the software or hardware architecture to be used to derive the benefits of this invention. The functional elements in FIG. 2 can be distributed across multiple hardware and software systems. The Search Server System may also be collocated with the User Device System in one single physical device.

Figure 3:
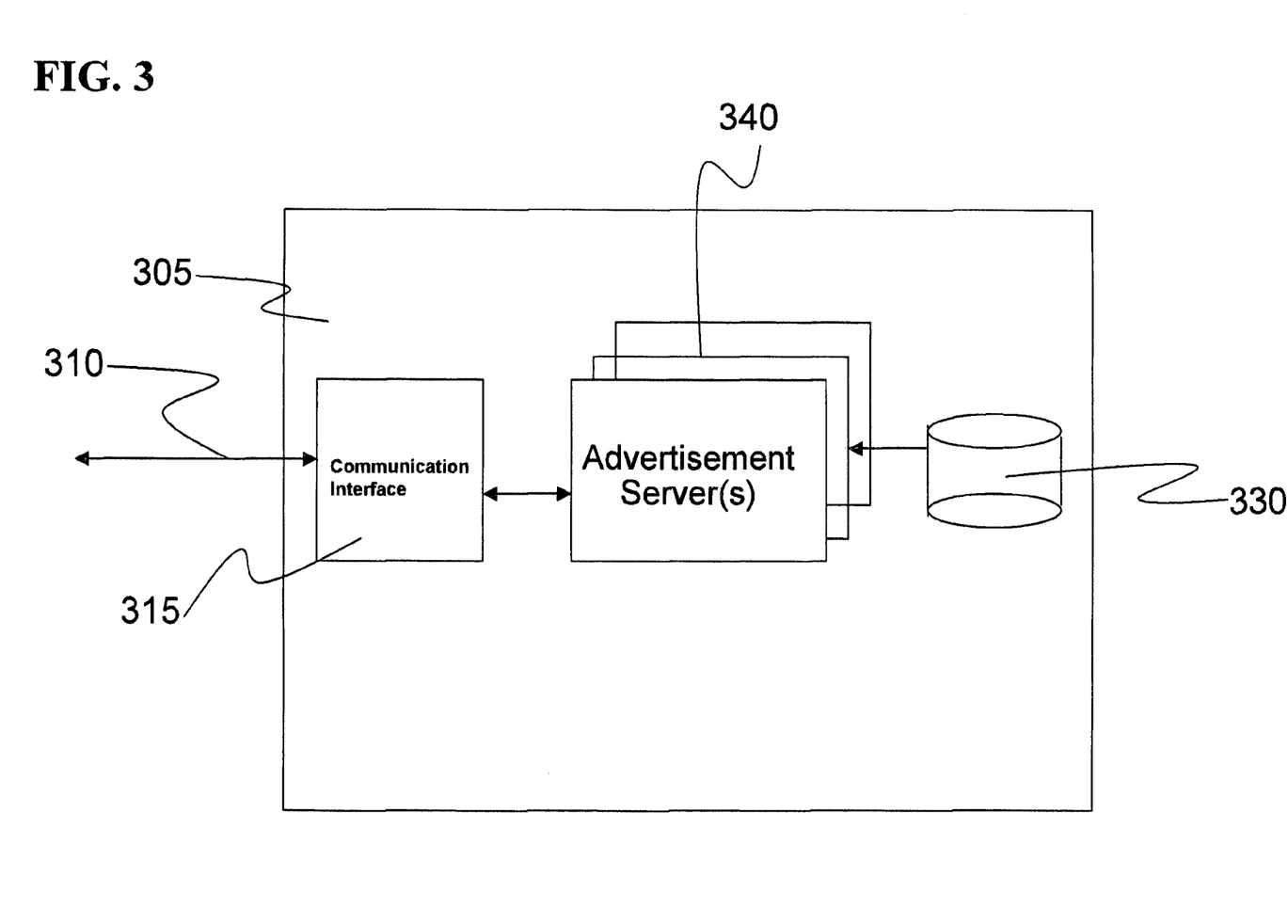
FIG. 3 is an exemplary simplified semi-schematic block diagram of an Advertisement Server System in accordance with this invention

FIG. 3 presents a simplified semi-schematic block diagram of an Advertisement Server System 305 in accordance with this invention. The Advertisement Server System is connected to a plurality of user devices 105 via the communication link 310 and a communication interface 315. The Advertisement Server System consists of one or more Advertisement Server(s) 340 that perform searches of advertisements for given target keyphrases as in this invention. Each Advertisement Server is connected to a third advertisement document index 330 that is used by the Advertisement Servers to establish the advertisements that correspond to any given target keyphrase. It will be appreciated that FIG. 3 is not prescriptive in terms of the software or hardware architecture to be used to derive the benefits of this invention. The functional elements in FIG. 3 can be distributed across multiple hardware and software systems.

It may be noted that the a proxy server could be used to connect the User Device System 105 with the Search Server System 205 and Advertisement Server System 305, so that the User Device System communicates with the proxy server and the proxy server in turn is communicates with the Search Server System 205 and the Advertisement Server System 305. The proxy server can then forward the user input to the appropriate server system(s) (Search Server System or Advertisement Server System) and combine the results from them to formulate the information necessary to form the screens to be presented to the user.

Figure 4:
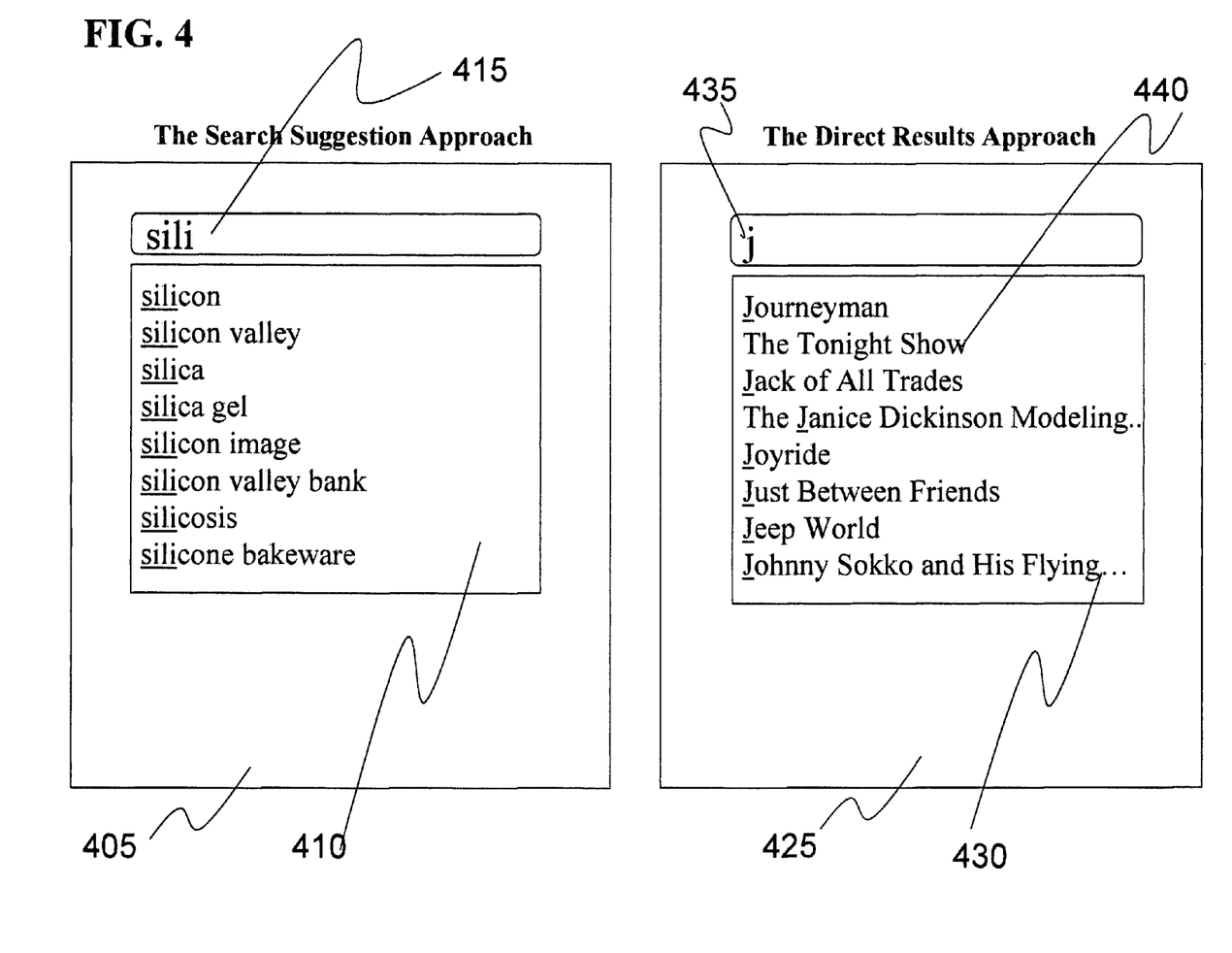
FIG. 4 illustrates two of the primary existing prior art approaches to minimize user text entry in search.

FIG. 4 illustrates two of the most common prior art approaches to minimize text entry by the user while searching. In the Search Suggestions Approach 405, as the user enters text 415 in the search bar, suggested target keyphrases 410 are presented to the user for selection. These target keyphrases are usually the most popular searches corresponding to the text entered in the search bar. This list of suggestions is typically not comprehensive. Therefore, even if the target keyphrase the user has in mind is not present in this list suggested by the system, corresponding documents may still be available in the search domain, and the user can still enter the full target keyphrase he had in mind and then launch a search. This approach is useful only when the exact target keyphrase the user had in mind is one of the suggestions. For searches that are not popular, this approach doesn't offer any improvement in reducing text entry compared to full target keyphrase entry, since the user mostly ends up entering the full target keyphrase. The target keyphrase search suggestions may also be presented in alternate ways, for example, as clickable buttons labeled with search target keyphrase suggestions and which can be swiped from one direction to another on a multitouch screen to see more suggestions. Once a search suggestion is selected, a search for that target keyphrase suggestion is automatically launched, and hence the user cannot compose a longer target keyphrase or modify the suggested target keyphrase using the search suggestion as part of the intended target keyphrase. In the Direct Results Approach 425, as text is entered, it is mapped to all possible target keyphrases corresponding to that text and then a search for those target keyphrases is performed among the documents being searched. The results are then combined and presented to the user. In the example in panel 425, the text "j" 435 entered by the user translates to multiple target keyphrases, one of which is "jay leno". A search for "jay leno" includes "The Tonight Show" as a result 440, so it is presented along with the results 430 for other keywords corresponding to "j". Since the text entered by the user could translate to multiple target keyphrases, it is difficult to interface such a system with advertisement systems that work on keyphrases since it is difficult to predict which one of the many possible keyphrases corresponding to the user entered text was the exact one the user had in mind. In contrast, this present invention minimizes the effort required by the user in text entry while searching, yet can be easily integrated with existing keyword based contextual intent-based advertisement systems. Also, in the Direct Results Approach as in 425, the user may be confused by the results that appear since he may not be able to appreciate which target keyphrase corresponding to the text he entered has resulted in a given result from being displayed.

Figure 5:
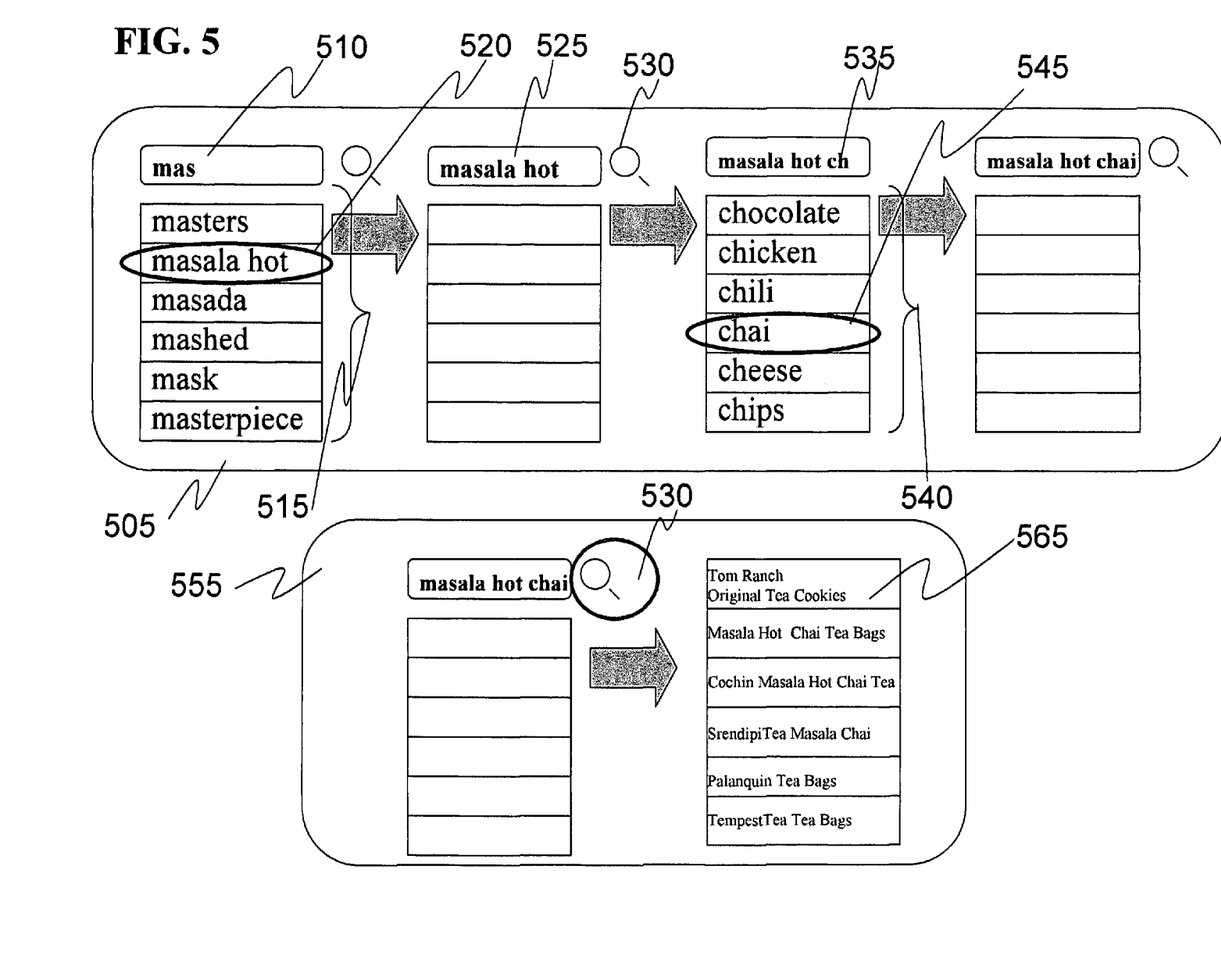
FIG. 5 is an exemplary illustration of the two-stage approach to search in accordance with this invention.
Figure 6:
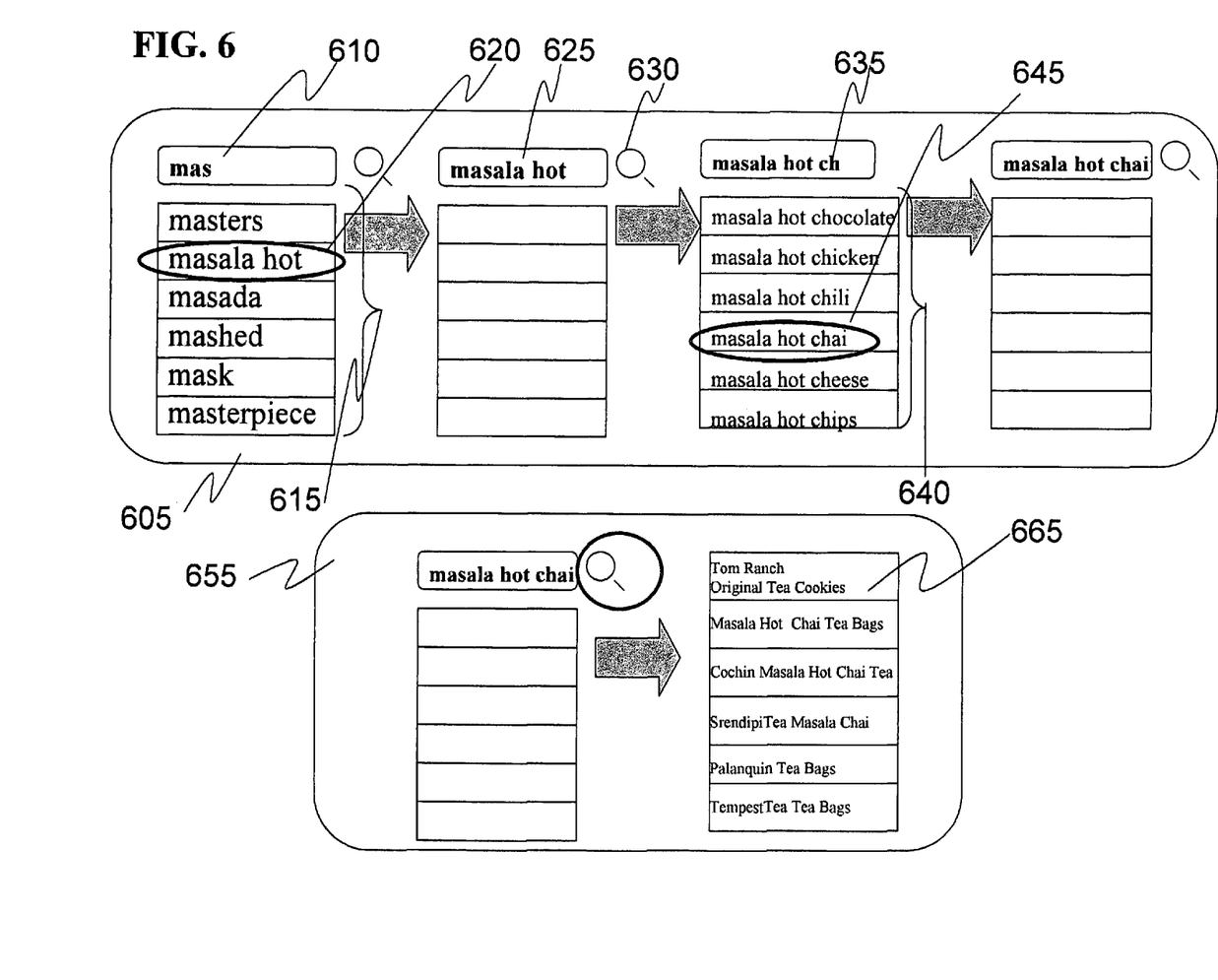
FIG. 6 is an exemplary illustration of a variation of the two-stage approach to search in accordance with this invention.

Operation of a particular embodiment in accordance with the practice of principles of this invention will be described below using FIG. 5. Panel 505 illustrates stage 1 of the two-stage search as embodied in this invention, whereas panel 555 illustrates stage 2. When the user opens the search interface on the User Device System 105, an empty search bar and empty results area are presented. Whenever the user enters a character of text in the search bar 510, the characters in the search bar (called the term) are sent to the Search Server System 205 by the User Device System 105. The search server that receives the term searches for that text within the first keyword index 225. All keywords and sub keyphrases that have a matching text are collected and are ordered based on the relevance of the term to the specific keywords/sub keyphrases. This relevance could be a factor of many aspects including but not limited to time of day, location of the user, importance of the keyword/sub keyphrase relative to other results, popularity of the keyword/sub keyphrase, personalization factors such as previous searches and previous results selected by the user, etc. The keyword and sub keyphrase results so generated, and ordered by relevance are sent back to the User Device System 105. These are displayed in the results area 515. If the user sees a keyword or sub keyphrase that he was looking for, he selects that item 520. Once the user selects a keyword or sub keyphrase, that keyword/sub keyphrase's text is added to the search bar 510 after any currently existing text there. Note that this is fundamentally different from the Search Suggestions prior art, where as soon as the user selects a search suggestion, a search is launched with that search suggestion as the target keyphrase. If the user has composed the full target keyphrase he has in mind, he can now select the search button 530 to launch a search for the target keyphrase. Otherwise, the user starts entering the text 535 for the next keyword or sub keyphrase in the target keyphrase he has in mind. This text is also sent to the Search Server System as before and keyword and sub keyphrase results are obtained. In one preferred embodiment of this invention, only the text entered after the previously selected keywords or sub keyphrases is sent and not all the text in the search bar. In this example, when "ch" 535 is entered only "ch" is sent, and not "masala hot ch". In another preferred embodiment of this invention, the entire text in the search bar is sent to the Search Server System. In such an embodiment, the Search Server System returns keywords and sub keyphrases corresponding to the incomplete last word in the text so received, but may give higher relevance to the keywords and sub keyphrases which have the text sent to the Search Server System as a prefix. When the user selects the next keyword/sub key phrase 545 from the list of results 540, it is added to the search bar and the process for selecting the next keyword or sub keyphrase in the target keyphrase starts again. In one preferred embodiment of this invention, instead of presenting just the keyword and sub keyphrase results 540 corresponding to text entered after a prior selection of keyword or sub keyphrase 525 as in 540, the previous keyword/sub keyphrase selections are prepended to the current keyword/sub keyphrase results as in 640 in FIG. 6 where the prepended text is shown in gray and the current keyword/sub keyphrase results are shown in black. It is also possible that though the user has typed a full keyword no keyword or sub keyphrase matching his requirement is available in the first keyword index and hence is not among the results area 515 or 540 is empty. In this case, once the user selects the 'Space' key indicating the end of the keyword, the keyword/sub keyphrase selection process starts over as though the user has selected a keyword which is the same as the word he has just entered.

Once the user has composed the full target keyphrase he had in mind in the search bar as above, he selects the search button 530 to initiate the second stage which is a search for that target keyphrase using the second document index. The user device sends a search request for this target keyphrase to the Search Server System 205 which searches for the target keyphrase in the second document index 230 and orders the results according to the order of relevance of the target keyphrase to the documents. The relevance measure may include but is not limited to factors such as the importance of the document, position of the keyword in the document, location of the user, time of day, and other relevant personalization factors such as previous searches and results selected by the user, preferences of social networks to which the user belongs to, etc. Once the document results are generated, the Search Server System sends the results back to the user device which displays the results 565 on the display 110 for selection and further action by the user.

In one preferred embodiment of this invention, in the second stage, a search request containing the target keyphrase is also sent to the Advertisement Server System 305 as well, in addition to sending it to the Search Server System 205. The Advertisement Server System 305 searches for advertisements corresponding to the full target keyphrase using the third advertisement index 330 and orders those advertisements in an order of relevance and commercial importance so as to maximize the revenue to the search provider while providing most relevant advertisements to the user's search. These ordered advertisement results are then sent back to the User Device System 105, which displays them on the display 110 at the appropriate location.

What is claimed is:

1. A computer implemented method for composing a target keyphrase to be searched, wherein the target keyphrase comprises a plurality of keywords, the computer implemented method comprising:
   receiving, in a search bar, one or more textual characters following at least one previously existing keyword;
   providing a plurality of keyword results associated only with the one or more textual characters irrespective of the at least one previously existing keyword;
   receiving a selection input for selecting a keyword result from amongst the plurality of keyword results associated only with the one or more textual characters irrespective of the at least one previously existing keyword; and
   word by word composing the target keyphrase by appending the selected keyword result associated only with the one or more textual characters irrespective of the at least one previously existing keyword to the at least one previously existing keyword in the search bar without launching search.

2. The computer implemented method as claimed in claim 1, wherein the providing further comprises ordering the plurality of keyword results based on relevance with the one or more textual characters.

3. The computer implemented method as claimed in claim 2, wherein the relevance is determined based on an ordering criteria, wherein the ordering criteria include one of popularity of terms, relative importance of terms, location of a user, current time, terms from past search queries, and past terms selected by the user.

4. The computer implemented method as claimed in claim 1, wherein the providing further comprises searching the one or more textual characters within a keyword index.

5. The computer implemented method as claimed in claim 1, wherein the providing is based on the at least one previously existing keyword.

6. The computer implemented method as claimed in claim 1, wherein the plurality of keyword results includes the one or more textual characters as prefix.

7. A computer implemented user interface implemented on a computing system having a memory and a processor, for composing a target keyphrase to be searched, wherein the target keyphrase comprises a plurality of keywords, the computer implemented interface comprising:
   a search bar for receiving, by the processor, one or more textual characters following at least one previously existing keyword; and
   a keyword results area for providing, by the processor, a plurality of keyword results associated only with the one or more textual characters irrespective of the at least one previously existing keyword, and receiving a selection input for selecting a keyword result from amongst the plurality of keyword results associated only with the one or more textual characters irrespective of the at least one previously existing keyword, wherein the selected keyword result associated only with the one or more textual characters irrespective of the at least one previously existing keyword is appended to the at least one previously existing keyword in the search bar to word by word compose the target keyphrase without launching search.

8. The computer implemented user interface as claimed in claim 7 further comprising a document results area for providing, by the processor, documents matching to a target keyphrase.

9. The computer implemented user interface as claimed in claim 7 further comprising an advertisement results area for providing, by the processor, advertisement documents matching to a target keyphrase.

10. The computer implemented user interface as claimed in claim 7 further comprising a search button designed to initiate, by the processor, a search for the target keyphrase in a document index.

11. The computer implemented user interface as claimed in claim 7 further comprising a search button designed to initiate, by the processor, a search for the target keyphrase in an advertisement document index.

12. A system for composing a target keyphrase to be searched, wherein the target keyphrase comprises a plurality of keywords, the system comprising:
   a display configured for displaying in a search bar one or more textual characters following at least one previously existing keyword; and a control unit configured for providing a plurality of keyword results associated only with the one or more textual characters irrespective of the at least one previously existing keyword, and receiving a selection input for selecting a keyword result from amongst the plurality of keyword results associated only with the one or more textual characters irrespective of the at least one previously existing keyword, wherein the selected keyword result associated only with the one or more textual characters irrespective of the at least one previously existing keyword is appended to the at least one previously existing keyword in the search bar to word by word compose the target keyphrase without launching search.

13. The system as claimed claim 12, wherein the system further comprising a communication interface configured to send the one or more textual characters to a search server.

14. The system as claimed claim 12, wherein the system further comprising a communication interface configured to send the one or more textual characters to an advertisement server.

\* \* \* \* \*